United States Patent
Muñoz De La Torre Alonso et al.

(10) Patent No.: US 12,185,229 B2
(45) Date of Patent: Dec. 31, 2024

(54) DISCOVERY OF WHICH NEF OR AF IS SERVING A UE

(71) Applicant: Telefonaktiebolaget LM Ericsson (publ), Stockholm (SE)

(72) Inventors: Miguel Angel Muñoz De La Torre Alonso, Madrid (ES); Miguel Angel Puente Pestaña, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 347 days.

(21) Appl. No.: 17/767,085

(22) PCT Filed: Dec. 9, 2019

(86) PCT No.: PCT/EP2019/084278
§ 371 (c)(1),
(2) Date: Apr. 7, 2022

(87) PCT Pub. No.: WO2021/069088
PCT Pub. Date: Apr. 15, 2021

(65) Prior Publication Data
US 2022/0369212 A1    Nov. 17, 2022

(30) Foreign Application Priority Data
Oct. 10, 2019  (EP) ..................... 19382886

(51) Int. Cl.
*H04W 48/16* (2009.01)
*H04L 41/122* (2022.01)
*H04L 41/50* (2022.01)

(52) U.S. Cl.
CPC ........... *H04W 48/16* (2013.01); *H04L 41/122* (2022.05); *H04L 41/5058* (2013.01)

(58) Field of Classification Search
CPC ..... H04W 48/16; H04W 60/00; H04W 24/02; H04W 24/08; H04W 36/00837; H04W 36/008375; H04W 36/0094; H04L 41/122; H04L 41/5058; H04L 43/0817
See application file for complete search history.

(56) References Cited

U.S. PATENT DOCUMENTS

| | | | |
|---|---|---|---|
| 2020/0112868 A1* | 4/2020 | Shariat | H04W 48/06 |
| 2020/0112907 A1* | 4/2020 | Dao | H04W 4/40 |
| 2021/0014141 A1* | 1/2021 | Patil | H04W 76/25 |
| 2021/0022022 A1* | 1/2021 | Guo | H04L 41/14 |
| 2021/0099367 A1* | 4/2021 | Han | H04W 24/10 |
| 2021/0306231 A1* | 9/2021 | Lee | H04L 41/14 |

(Continued)

OTHER PUBLICATIONS

WO 2020/066890 A1 (Year: 2020).*

(Continued)

*Primary Examiner* — Rushil P. Sampat
(74) *Attorney, Agent, or Firm* — Weisberg I.P. Law, P.A.

(57) ABSTRACT

There is provided mechanisms for discovering, for data collection, which NEF or AF is serving a UE. A method is performed by an NWDAF entity. The method includes providing, to a 5GC network function entity, a query of which NEF or AF is serving the UE. The method includes receiving, from the 5GC network function entity, a response comprising an ID of the NEF or the AF when there is a NEF or AF instance stored in the 5GC network function entity for the UE.

17 Claims, 8 Drawing Sheets

(56) References Cited

U.S. PATENT DOCUMENTS

2022/0039046 A1* 2/2022 Ianev .................. H04L 43/0817
2022/0337486 A1* 10/2022 Hong ...................... H04L 41/14

OTHER PUBLICATIONS

3GPP, "3GPP TS 23.288 V16.1.0", 3rd Generation Partnership Project; Technical Specification Group Services and System Aspects; Architecture enhancements for 5G System (5GS) to support network data analytics services (Release 16), Sep. 2019, 1-52.

3GPP, "3GPP TS 23.501 V16.2.0", 3rd Generation Partnership Project; Technical Specification Group Services and System Aspects; System Architecture for the 5G System (5GS); Stage 2 (Release 16), Sep. 2019, 1-391.

3GPP, "3rd Generation Partnership Project; Technical Specification Group Services and System Aspects; Procedures for the 5G System (5GS); Stage 2 (Release 16)", 3GPP TS 23.502 V16.2.0, Sep. 2019, 525 pages.

Ericsson, "Editor's Notes cleanup", SA WG2 Meeting #S2-135, S2-190911, Split Croatia, Oct. 14-18, 2019, 1-5.

Samsung, "AF instance selection for data collection", SA WG2 Meeting #135, S2-1909169, Split, Croatia, Oct. 14-18, 2019, 1-6.

* cited by examiner

DISCOVERY OF WHICH NEF OR AF IS SERVING A UE

TECHNICAL FIELD

Embodiments presented herein relate to a method, an NWDAF entity, a computer program, and a computer program product for discovering, for data collection, which NEF or AF is serving a UE. Embodiments presented herein further relate to a method, a network function entity, a computer program, and a computer program product for enabling discovery, for data collection, which NEF or AF is serving a UE

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is data collection and analytics.

In this respect, the network data analytics function (NWDAF) is part of the architecture specified in the third generation partnership project (3GPP) technical specification (TS) 23.501 entitled "System architecture for the 5G System (5GS)", version 16.2.0, and uses the mechanisms and interfaces specified for the fifth generation core network (5GC) and Operations, Administration and Maintenance (OAM).

The NWDAF interacts with different entities for different purposes, such as data collection based on event subscription, provided by network functions (NF) such as Access and Mobility Management Function (AMF), Session Management Function (SMF), Policy Control Function (PCF), Unified Data Management (UDM) entity, Binding Support Function (BSF), Application Function (AF) (directly or via Network Exposure Function (NEF)), and OAM; retrieval of information from data repositories (e.g. Unified Data Repository (UDR) via UDM for subscriber-related information); retrieval of information about NFs (e.g. Network Repository Function (NRF) for NF-related information, and Network Slice Selection Function (NSSF) for slice-related information); and on demand provision of analytics to consumers.

A single instance or multiple instances of the NWDAF may be deployed in a mobile network, such as in a Public Land Mobile Network (PLMN). In case multiple NWDAF instances are deployed, the architecture supports deploying the NWDAF as a central NF, as a collection of distributed NFs, or as a combination of both. When multiple NWDAFs exist, not all of them need to be able to provide the same type of analytics results, i.e., some of them can be specialized in providing certain types of analytics. An Analytics ID information element is used to identify the type of supported analytics that NWDAF can generate. NWDAF instance(s) can be collocated with a 5GS NF.

To retrieve data related to a specific UE, the NWDAF first needs to determine which NF instances are serving this UE, as stated in table 6.2.2.1-2 of aforementioned document 3GPP TS 23.501 unless the NWDAF has already obtained this information due to recent operations related to this UE. However, how the NWDAF determines which NEF and AF instances are serving a specific UE is still undefined.

Hence, there is still a need for improved discovery mechanisms in communication networks, and especially, but not exclusively, in the fifth generation core network.

SUMMARY

An object of embodiments herein is to provide efficient discovering for the NWDAF to determine which NEF or AF is serving a UE.

According to a first aspect there is presented a method for discovering, for data collection, which NEF or AF is serving a UE. The method is performed by an NWDAF entity. The method comprises providing, to a 5GC network function entity, a query of which NEF or AF is serving the UE. The method comprises receiving, from the 5GC network function entity, a response comprising an ID of the NEF or the AF when there is a NEF or AF instance stored in the 5GC network function entity for the UE.

According to a second aspect there is presented an NWDAF entity for discovering, for data collection, which NEF or AF is serving a UE. The NWDAF entity comprises processing circuitry. The processing circuitry is configured to cause the NWDAF entity to provide, to a 5GC network function entity, a query of which NEF or AF is serving the UE. The processing circuitry is configured to cause the NWDAF entity to receive, from the 5GC network function entity, a response comprising an ID of the NEF or the AF when there is a NEF or AF instance stored in the 5GC network function entity for the UE.

According to a third aspect there is presented an NWDAF entity for discovering, for data collection, which NEF or AF is serving a UE. The NWDAF entity comprises a provide module configured to provide, to a 5GC network function entity, a query of which NEF or AF is serving the UE. The NWDAF entity comprises a receive module configured to receive, from the 5GC network function entity, a response comprising an ID of the NEF or the AF when there is a NEF or AF instance stored in the 5GC network function entity for the UE.

According to a fourth aspect there is presented a computer program for discovering, for data collection, which NEF or AF is serving a UE, the computer program comprising computer program code which, when run on processing circuitry of an NWDAF entity, causes the NWDAF entity to perform a method according to the first aspect.

According to a fifth aspect there is presented a method for enabling discovery, for data collection, which NEF or AF is serving a UE. The method being performed by a 5GC network function entity. The method comprises receiving, from an NWDAF entity, a query of which NEF or AF is serving the UE. The method comprises providing, to the NWDAF entity, a response comprising an ID of the NEF or the AF when there is a NEF or AF instance stored in the 5GC network function entity for the UE.

According to a sixth aspect there is presented a 5GC network function entity for enabling discovery, for data collection, which NEF or AF is serving a UE. The 5GC network function entity comprises processing circuitry. The processing circuitry is configured to cause the 5GC network function entity to receive, from an NWDAF entity, a query of which NEF or AF is serving the UE. The processing circuitry is configured to cause the 5GC network function entity to provide, to the NWDAF entity, a response comprising an ID of the NEF or the AF when there is a NEF or AF instance stored in the 5GC network function entity for the UE.

According to a seventh aspect there is presented a 5GC network function entity for enabling discovery, for data collection, which NEF or AF is serving a UE. The 5GC network function entity comprises a receive module configured to receive, from an NWDAF entity, a query of which NEF or AF is serving the UE. The 5GC network function entity comprises a provide module configured to provide, to the NWDAF entity, a response comprising an ID of the NEF or the AF when there is a NEF or AF instance stored in the 5GC network function entity for the UE.

According to an eight aspect there is presented a computer program for enabling discovery, for data collection, which NEF or AF is serving a UE, the computer program comprising computer program code which, when run on processing circuitry of a 5GC network function entity, causes the 5GC network function entity to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these NWDAF entities, these 5GC network function entities, these computer programs, and this computer program product provide efficient discovering for the NWDAF to determine which NEF or AF is serving the UE.

Advantageously these methods, these computer programs, and this computer program product can be used by any NF (not only the NWDAF entity) to discover and communicate with a NEF or an AF serving a specific UE.

Other objectives, features and advantages of the enclosed embodiments will be apparent from the following detailed disclosure, from the attached list of claims as well as from the drawings.

Generally, all terms used in the claims are to be interpreted according to their ordinary meaning in the technical field, unless explicitly defined otherwise herein. All references to "a/an/the element, apparatus, component, means, module, action, etc." are to be interpreted openly as referring to at least one instance of the element, apparatus, component, means, module, action, etc., unless explicitly stated otherwise.

The actions of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
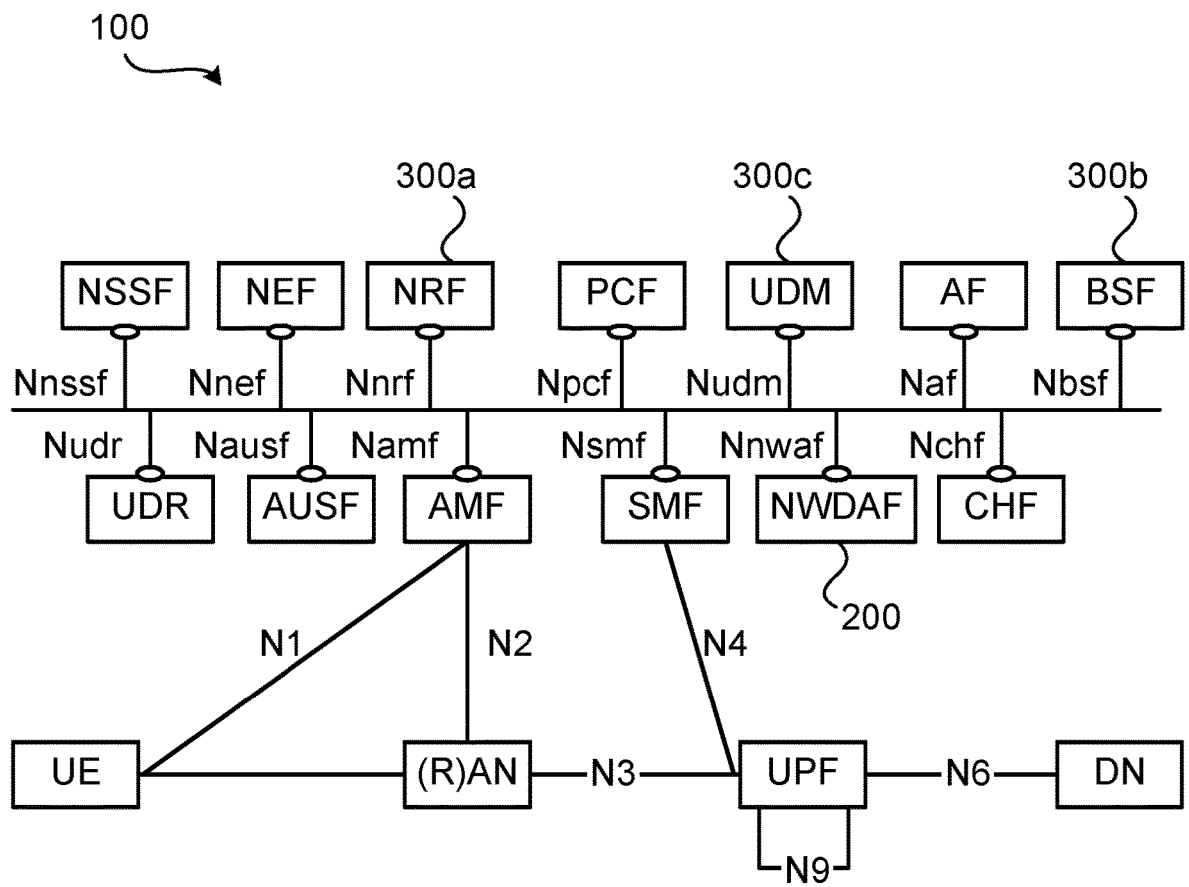
FIG. 1 is a schematic diagram illustrating a communication network according to embodiments.

FIG. 1 is a schematic diagram illustrating a communication network 100 where embodiments presented herein can be applied. The communication network 100 represents a reference architecture of a fifth generation telecommunication system (5GS) and comprises the following entities: and Authentication Server Function (AUSF), an Access and Mobility Management Function (AMF), a Data Network (DN), e.g. operator services, Internet access or 3rd party services, a Network Exposure Function (NEF), a Network Repository Function (NRF), a Network Slice Selection Function (NSSF), a Policy Control Function (PCF), a Session Management Function (SMF), a Unified Data Management (UDM), a Unified Data Repository (UDR), a User Plane Function (UPF), an Application Function (AF), a User Equipment (UE), a (Radio) Access Network ((R)AN), a Network Data Analytics Function (NWDAF), a Binding Support Function (BSF), and a Charging Function (CHF). Service based interfaces are represented by the format Nxyz (e.g., Nnssf, NNef, etc.) and point to point interfaces are represented by the format Nx (e.g. N1, N2, etc.).

As noted above how the NWDAF determines which NEF and AF instances are serving a UE is still undefined and hence, there is still a need for improved discovery mechanisms in communication networks, and especially, but not exclusively, in the fifth generation core network.

The embodiments disclosed herein therefore relate to mechanisms for discovering, for data collection, which NEF or AF is serving a UE and enabling discovery, for data collection, which NEF or AF is serving a UE. In order to obtain such mechanisms there is provided an NWDAF entity 200, a method performed by the NWDAF entity 200, a computer program product comprising code, for example in the form of a computer program, that when run on processing circuitry of the NWDAF entity 200, causes the NWDAF entity 200 to perform the method. In order to obtain such mechanisms there is further provided a 5GC network function entity 300a, 300b, 300c, a method performed by the 5GC network function entity 300a, 300b, 300c, and a computer program product comprising code, for example in the form of a computer program, that when run on processing circuitry of the 5GC network function entity 300a, 300b, 300c, causes the 5GC network function entity 300a, 300b, 300c to perform the method.

Figure 2:
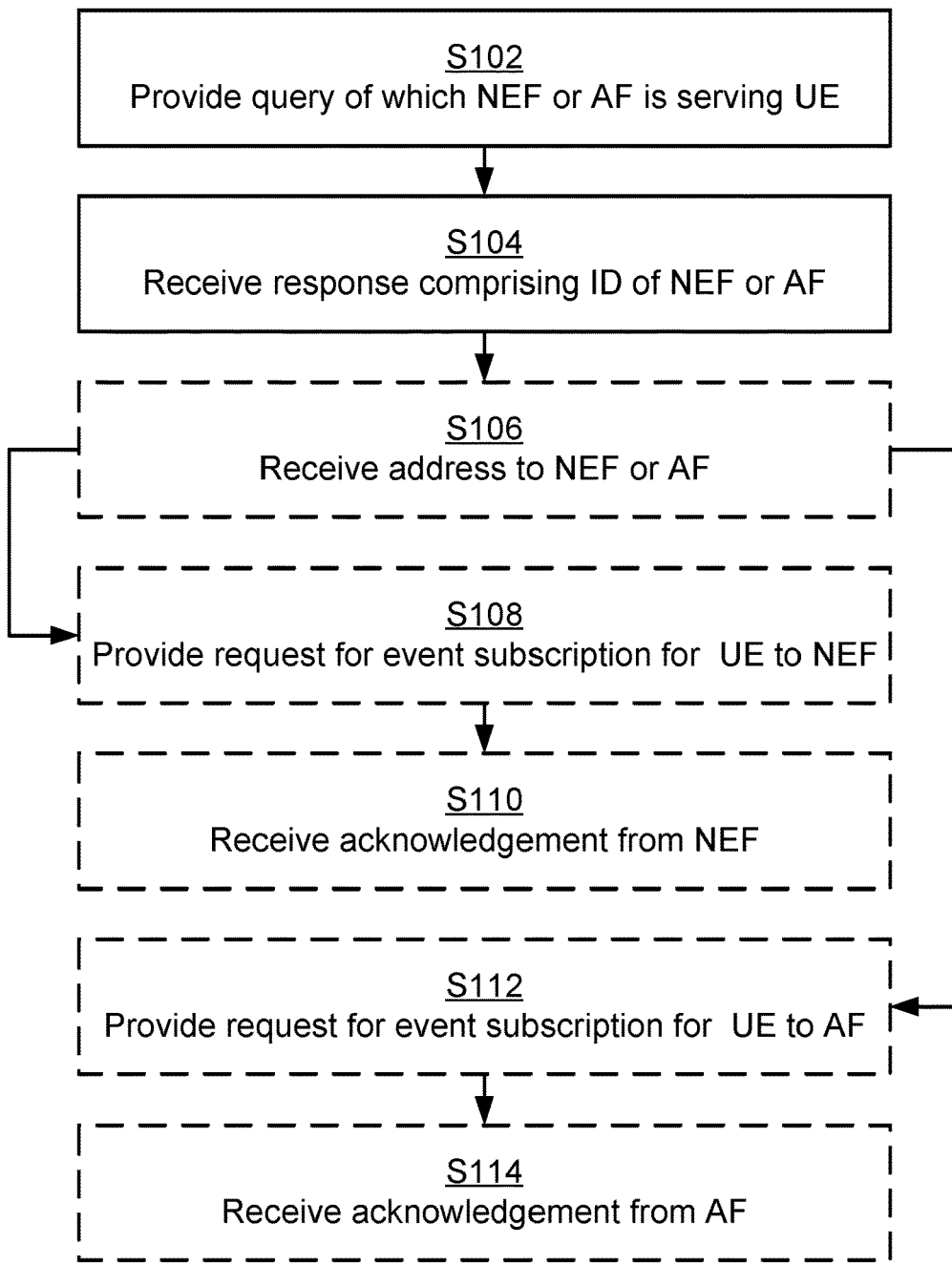
FIGS. 2 and 3 are flowcharts of methods according to embodiments.

Reference is now made to FIG. 2 illustrating a method for discovering, for data collection, which NEF or AF is serving a UE as performed by the NWDAF entity 200 according to an embodiment.

S102: The NWDAF entity 200 provides, to a 5GC network function entity 300a, 300b, 300c, a query of which NEF or AF is serving the UE. There might be different examples of network function entities. According to a first example, the 5GC network function entity 300a, 300b, 300c is an NRF 300a. According to a second example, the 5GC network function entity 300a, 300b, 300c is a BSF 300b. According to a third example, the 5GC network function entity 300a, 300b, 300c is a UDM entity 300c.

S104: The NWDAF entity 200 receives, from the 5GC network function entity 300a, 300b, 300c, a response comprising an ID of the NEF or the AF when there is a NEF or AF instance stored in the 5GC network function entity 300a, 300b, 300c for the UE.

Embodiments relating to further details of discovering, for data collection, which NEF or AF is serving a UE as performed by the NWDAF entity 200 will now be disclosed.

There might be different examples of queries that are provided in action S102. According to some embodiments, the query invokes a discovery service in the 5GC network function entity 300a, 300b, 300c. According to some embodiments, the query comprises an ID of the UE.

As will be further disclosed below with reference to FIG. 7 the NRF might provide to the NWDAF entity 200 an address to the NEF or the AF. Hence, according to an embodiment, the NWDAF entity 200 is configured to perform action S106:

S106: The NWDAF entity 200 receives, from the NRF, an address to the NEF or the AF.

In some embodiments when the 5GC network function entity 300a, 300b, 300c is the NRF, the address to the NEF or the AF is received in the response from the 5GC network function entity 300a, 300b, 300c (i.e., in the response received by the NWDAF entity 200 in action S104). Action S102 might then be equal to action 5 in FIG. 7

In some embodiments when the 5GC network function entity 300a, 300b, 300c is not the NRF, the address to the NEF or the AF is received in response to the NWDAF entity 200 having provided a query to the NRF for a discovery service. The query in action S102 is then equal to either action 1 or action 3 in FIG. 7 and the query provided to the NRF for the discovery service is equal to action 5 in FIG. 7.

As will be further disclosed below, the AF might be in either trusted mode or untrusted mode. Different actions might be performed depending on whether the AF is in trusted mode or in untrusted mode. According to a first example, the address to the AF is received when the AF is in trusted mode, and the address to the NEF is received when the AF is in untrusted mode. This provides the NWDAF entity 200 with an indirect indication as to whether the AF is in trusted mode or in untrusted mode. According to a second example, an explicit indication of whether the AF is in trusted mode or in untrusted mode is by the NWDAF entity 200 received from the NRF.

As will be further disclosed below with reference to actions 7 and 8 of FIG. 7, when the AF is in untrusted mode, any request for event subscription for the UE is provided to the NEF. Thus, according to some embodiments, when the AF is in untrusted mode, the NWDAF entity 200 is configured to perform (optional) actions S108, S110:

S108: The NWDAF entity 200 provides, to the NEF, a request for event subscription for the UE. The request comprises an ID of the UE and at least one identifier of metrics to be collect by the NWDAF for the UE.

S110: The NWDAF entity 200 receives, from the NEF, an acknowledgement of the event subscription.

As will be further disclosed below with reference to actions 11 and 12 of FIG. 7, when the AF is in trusted mode, any request for event subscription for the UE is provided to the AF. Thus, according to some embodiments, when the AF is in trusted mode, the NWDAF entity 200 is configured to perform (optional) actions S112, S114:

S112: The NWDAF entity 200 provides, to the AF, a request for event subscription for the UE, the request comprising an ID of the UE and at least one identifier of metrics to be collect by the NWDAF for the UE.

S114: The NWDAF entity 200 receives, from the AF, an acknowledgement of the event subscription.

As disclosed above, a response is in action S104 received when there is a NEF or AF instance stored in the 5GC network function entity 300a, 300b, 300c for the UE. In some embodiments the response instead comprises an error indication in case there is no NEF or AF instance stored in the 5GC network function entity 300a, 300b, 300c for the UE.

Figure 3:
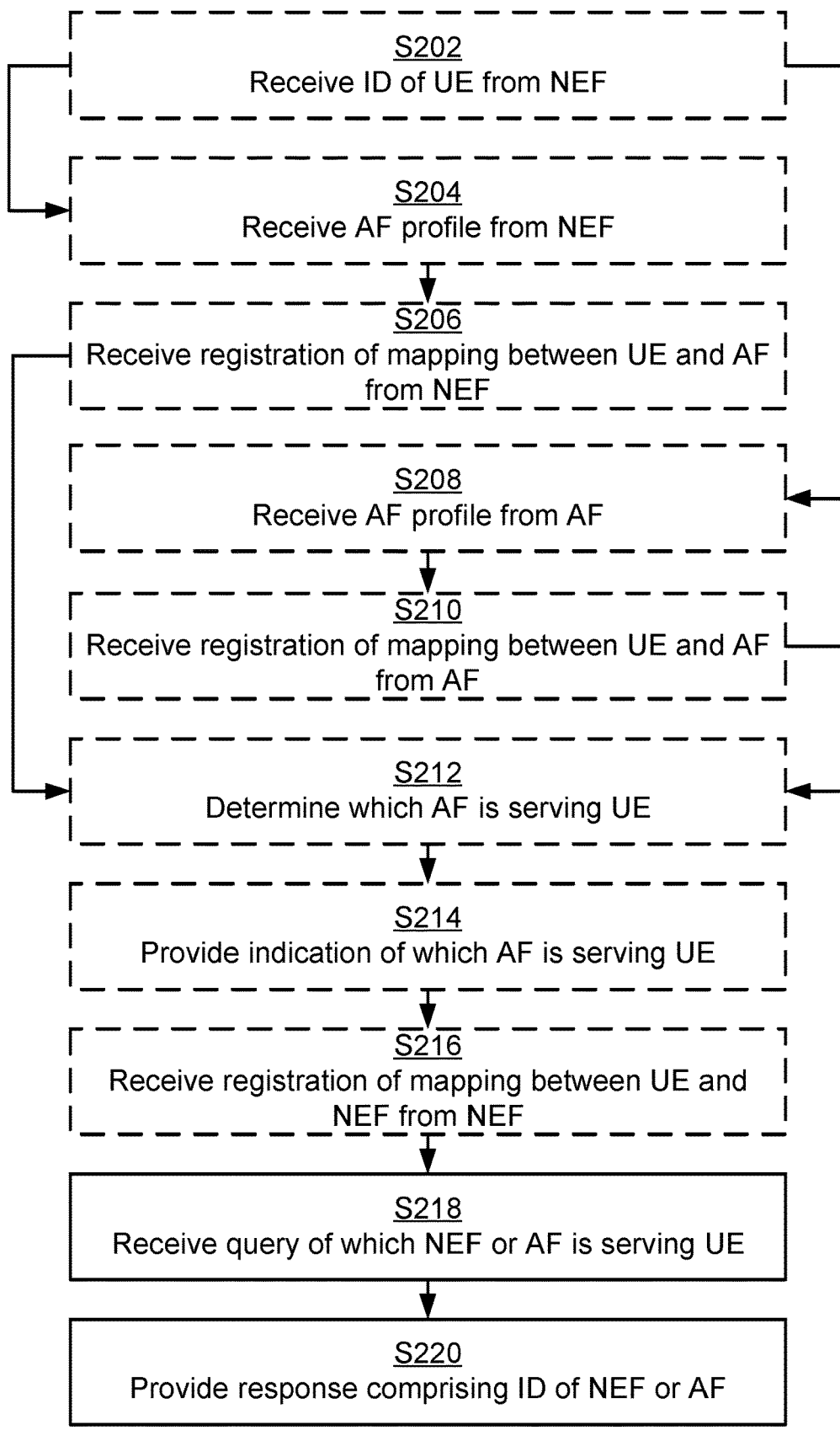

Reference is now made to FIG. 3 illustrating a method for enabling discovery, for data collection, which NEF or AF is serving a UE as performed by the 5GC network function entity 300a, 300b, 300c according to an embodiment. As above, there might be different examples of network function entities. According to a first example, the 5GC network function entity 300a, 300b, 300c is an NRF 300a. According to a second example, the 5GC network function entity 300a, 300b, 300c is a BSF 300b. According to a third example, the 5GC network function entity 300a, 300b, 300c is a UDM entity 300c.

S218: The 5GC network function entity 300a, 300b, 300c receives, from the NWDAF entity 200, a query of which NEF or AF is serving the UE.

S220: The 5GC network function entity 300a, 300b, 300c provides, to the NWDAF entity 200, a response comprising an ID of the NEF or the AF when there is a NEF or AF instance stored in the 5GC network function entity 300a, 300b, 300c for the UE.

Embodiments relating to further details of enabling discovery, for data collection, which NEF or AF is serving a UE as performed by the 5GC network function entity 300a, 300b, 300c will now be disclosed.

As above, in some embodiments, the query invokes a discovery service in the 5GC network function entity 300a, 300b, 300c. As above, in some embodiments, the query comprises an ID of the UE.

As above, in some embodiments when the 5GC network function entity 300a, 300b, 300c is an NRF, an address to the NEF or the AF is provided in the response. As above, in some embodiments, the address to the AF is provided when the AF is in trusted mode, and wherein the address to the NEF is provided when the AF is in untrusted mode. As above, in some embodiments, an explicit indication of whether the AF is in trusted mode or in untrusted mode is provided to the NWDAF entity 200.

Aspects of possible actions that the 5GC network function entity 300a, 300b, 300c might perform before it receives, from the NWDAF entity 200, the query in action S118 of which NEF or AF is serving the UE will now be disclosed.

As will be further disclosed below with reference to action 1 of FIG. 4, the NEF might invoke the Nnrf_NFRegister service operation in the NRF, specifying that NFType=NEF, and the UE-ID range (i.e., the range of UE-IDs handled by this NEF instance). Thus, according to some embodiments, the 5GC network function entity 300a, 300b, 300c is configured to perform (optional) action S202:

S202: The 5GC network function entity 300a, 300b, 300c (such as the NRF) receives, from the NEF, an ID of the UE.

As will be further disclosed below with reference to action 6 of FIG. 4, the NEF might register the AF profile in the NRF, invoking the Nnrf_NFRegister service, and specifying that NFType=AF, the App-ID, and that trust=UNTRUSTED. Thus, according to some embodiments, when the AF is in untrusted mode, the 5GC network function entity 300a, 300b, 300c is configured to perform (optional) action S204:

S204: The 5GC network function entity 300a, 300b, 300c receives, from the NEF when the AF is in untrusted mode, an AF profile for registration of the AF in the network function (such as the NRF). The AF profile comprises an indication that the AF is in untrusted mode.

As will be further disclosed below with reference to action 8 of FIG. 4, the AF might register itself the AF profile in the NRF, invoking the Nnrf_NFRegister service, and specifying that NFType=AF, the App-ID, and that trust=TRUSTED (i.e., an indication that the AF is in trusted mode. Thus, according to some embodiments, when the AF is in trusted mode, the 5GC network function entity 300a, 300b, 300c is configured to perform (optional) action S208:

S208: The 5GC network function entity 300a, 300b, 300c receives, from the AF when the AF is in trusted mode, an AF profile for registration of the AF in the network function (such as the NRF). The AF profile comprising an indication that the AF is in trusted mode.

As will be further disclosed below with reference to actions 8, 10, 12 of FIG. 5, the NEF might register the mapping between the UE and the AF when the AF is in untrusted mode. Thus, according to some embodiments, when the AF is in untrusted mode, the 5GC network function entity 300a, 300b, 300c is configured to perform (optional) action S206:

S206: The 5GC network function entity 300a, 300b, 300c (such as NRF, BSF, or UDM) receives, from the NEF when the AF is in untrusted mode, registration of a mapping between the UE and the AF.

As will be further disclosed below with reference to actions 14, 16, 18 of FIG. 5, the AF might itself register the mapping between the UE and the AF when the AF is in trusted mode. Thus, according to some embodiments, when the AF is in trusted mode, the 5GC network function entity 300a, 300b, 300c is configured to perform (optional) action S210:

S210: The 5GC network function entity 300a, 300b, 300c (such as NRF, BSF, or UDM) receives, from the AF when the AF is in trusted mode, registration of a mapping between the UE and the AF.

As will be further disclosed below with reference to actions 7, 8, 10 of FIG. 6, the NRF might determine which NEF is serving the UE. Thus, according to some embodiments, when the 5GC network function entity 300a, 300b, 300c is the NRF, the 5GC network function entity 300a, 300b, 300c is configured to perform (optional) actions S212, S214:

S212: The 5GC network function entity 300a, 300b, 300c determines which NEF is serving the UE.

S214: The 5GC network function entity 300a, 300b, 300c provides, to the BSF and the UDM, an indication of the NEF that is serving the UE.

Alternatively, the NEF determines the mapping between the UE and the NEF and provides information of the mapping to the network function entity 300a, 300b, 300c (such as NRF, BSF, or UDM). Thus, according to some embodiments, the 5GC network function entity 300a, 300b, 300c is configured to perform (optional) action S216:

S216: The 5GC network function entity 300a, 300b, 300c receives registration of a mapping between the UE and the NEF from the NEF.

Next, three particular embodiments based on at least some of the above disclosed embodiments will be disclosed. In some of these embodiments, different alternatives are covered. In this respect, the notation Option 1, Option 2, and Option 3 is used to identify three different alternatives. Thus, when an action pertaining to Option 1 is performed, neither any action pertaining to Option 2 nor any action pertaining to Option 3 is performed, and vice versa. Thus, only the actions of one of Option 1, Option 2, and Option 3 are performed per alternative.

Figure 4:
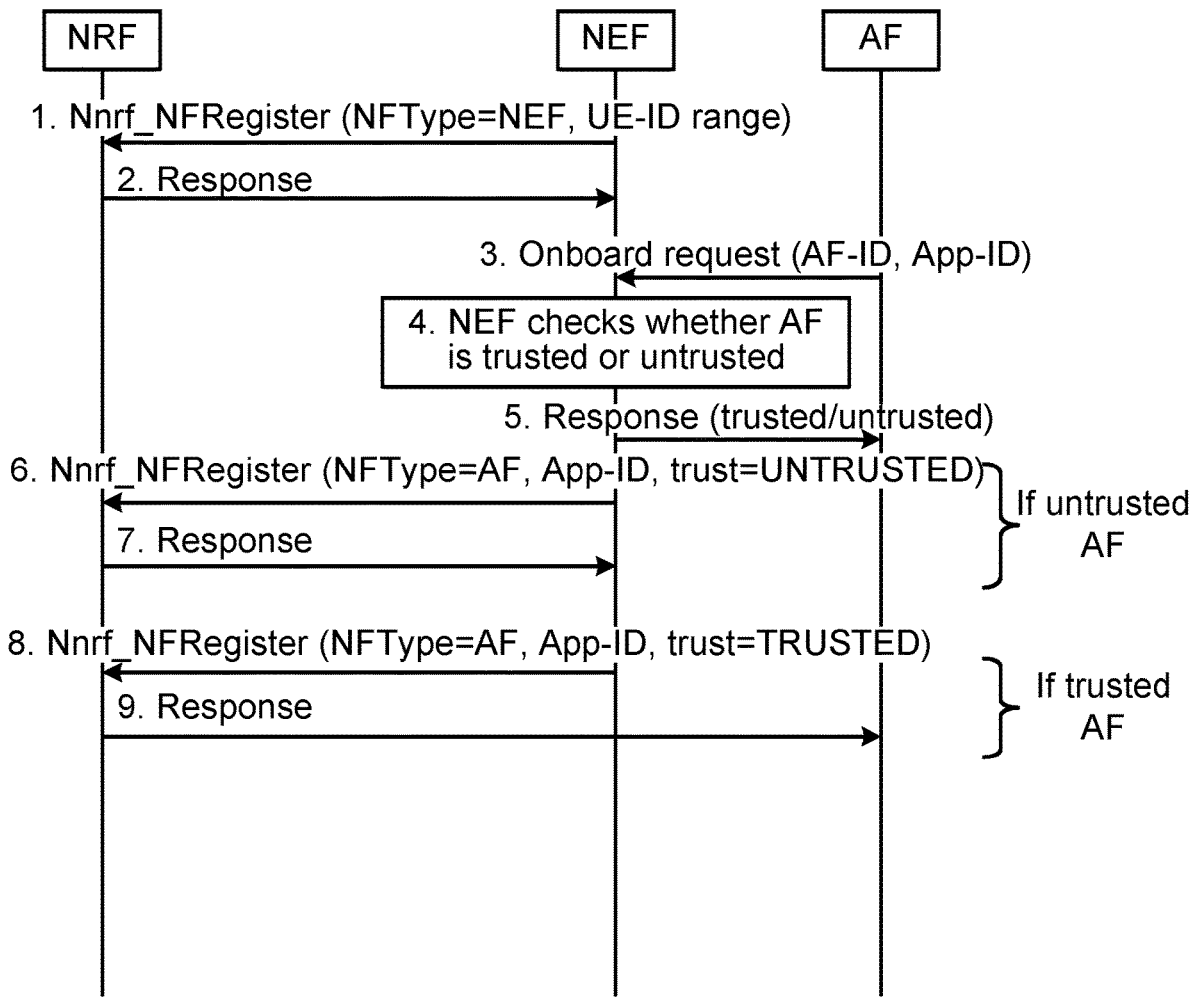
FIGS. 4, 5, 6, and 7 are signaling diagrams according to embodiments.

One particular embodiment for a registration procedure in the NRF of the NEF and the AF based on at least some of the above disclosed embodiments will now be disclosed in detail with reference to the signaling diagram of FIG. 4.

According to this embodiment, the above disclosed 5GC network function entity 300a, 300b, 300c is an NRF 300a.

1. The NEF invokes the Nnrf_NFRegister service operation in the NRF, specifying that NFType=NEF, and the UE-ID range (i.e., the range of UE-IDs handled by this NEF instance).
2. The NRF acknowledges the registration.
3. The AF sends an onboard request to NEF, specifying the AF-ID, and the App-ID.
4. The NEF checks whether the AF is trusted or untrusted.
5. The NEF acknowledges the onboarding request, including whether the AF is deemed as trusted or untrusted.

If the AF is in untrusted mode, actions 6 and 7 are performed.

6. The NEF registers the AF profile in the NRF, invoking the Nnrf_NFRegister service, and specifying that NFType=AF, the App-ID, and that trust=UNTRUSTED (i.e., an indication that the AF is in untrusted mode).
7. The NRF acknowledges the registration.

If the AF is in trusted mode, actions 8 and 9 are performed.

8. The AF registers itself the AF profile in the NRF, invoking the Nnrf_NFRegister service, and specifying that NFType=AF, the App-ID, and that trust=TRUSTED (i.e., an indication that the AF is in trusted mode.
9. The NRF acknowledges the registration.

Figure 5:
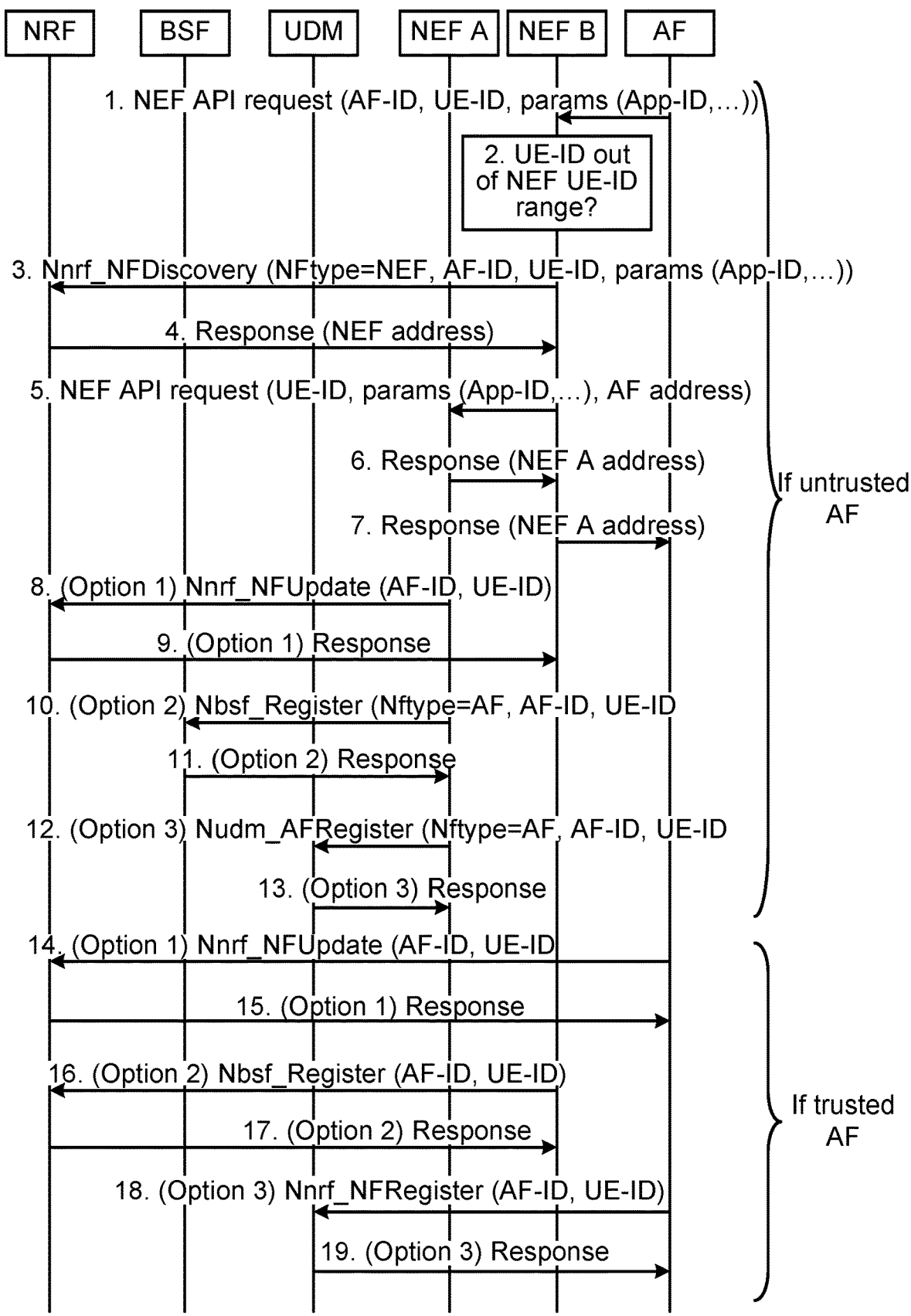

One particular embodiment for when the mapping between UE and AF instance is stored either in the NRF, the BSF or the UDM, for the AF being in untrusted mode and in trusted mode, respectively, based on at least some of the above disclosed embodiments will now be disclosed in detail with reference to the signaling diagram of FIG. 5.

According to this embodiment, Option 1 corresponds to that the above disclosed 5GC network function entity 300a, 300b, 300c is an NRF 300a, Option 2, corresponds to that the 5GC network function entity 300a, 300b, 300c is a BSF 300b, and Option 3 corresponds to that the 5GC network function entity 300a, 300b, 300c is a UDM entity 300c.

If the AF is in untrusted mode, actions 1 to 13 are performed.

1. The AF invokes an API in the default or front-end NEF (e.g. Application QoS, etc.), specifying the AF-ID, the UE-ID, and (optionally) other parameters (e.g. App-ID, . . . ).
2. The NEF verifies that the UE-ID is out of its UE-ID range.
3. The NEF discovers the NEF (i.e., NEF A) that is serving the UE by invoking the Nnrf_NFDiscovery service in the NRF, specifying that NFtype=NEF, and the UE-ID.
4. The NRF responds with the address of the NEF (i.e., of NEF A) whose UE-ID range includes the UE-ID.
5. The NEF invokes the same API as in action 1 in the NEF serving the UE, specifying the AF-ID, the UE-ID, the AF Address so that the NEF serving the UE is enabled to communicate with this AF, and (optionally) other parameters (e.g. App-ID, . . . ).
6. The NEF (i.e., NEF A) serving the UE responds to the default NEF (i.e., NEF B), specifying the address of the NEF serving the UE.
7. The default NEF responds to the AF, specifying the address of the NEF serving the UE. For any subsequent request (on a per UE basis) to the NEF, the AF sends the subsequent request using the address of the NEF serving the UE.
8. (Option 1) The NEF serving the UE registers the mapping between UE and AF instance in the NRF by invoking the Nnrf_NFUpdate service, and specifying the AF-ID and the UE-ID. Other parameters might optionally also be registered along the UE-ID, e.g. the App-ID, etc.
9. (Option 1) The NRF acknowledges the registration.
10. (Option 2) The NEF serving the UE registers the mapping between UE and AF instance in the BSF by invoking the Nbsf_Register service, and specifying that NFtype=AF, the AF-ID, and the UE-ID. Other parameters might optionally also be registered along the UE-ID, e.g. the App-ID, etc.
11. (Option 2) The BSF acknowledges the registration.
12. (Option 3) The NEF serving the UE registers the AF-UE mapping between UE and AF instance in the UDM by invoking the Nudm_AFRegister service, and specifying that NFtype=AF, the AF-ID, and the UE-ID. Other parameters might optionally also be registered along the UE-ID, e.g. the App-ID, etc.
13. (Option 3) The UDM acknowledges the registration.
If the AF is in trusted mode, actions 14 to 18 are performed.
14. (Option 1) The AF registers itself the mapping between UE and AF instance in the NRF by invoking the Nnrf_NFUpdate service, and specifying the AF-ID and the UE-ID. Other parameters might optionally also be registered along the UE-ID, e.g. the App-ID, etc.
15. (Option 1) The NRF acknowledges the registration.
16. (Option 2) The AF registers itself the mapping between UE and AF instance in the BSF by invoking the Nbsf_Register service, and specifying that NFtype=AF, the AF-ID, and the UE-ID. Other parameters might optionally also be registered along the UE-ID, e.g. the App-ID, etc.
17. (Option 2) The BSF acknowledges the registration.
18. (Option 3) The AF registers itself the mapping between UE and AF instance in the UDM by invoking the Nudm_AFRegister service, and specifying that NFtype=AF, the AF-ID, and the UE-ID. Other parameters might optionally also be registered along the UE-ID, e.g. the App-ID, etc.
19. (Option 3) The UDM acknowledges the registration.

Figure 6:
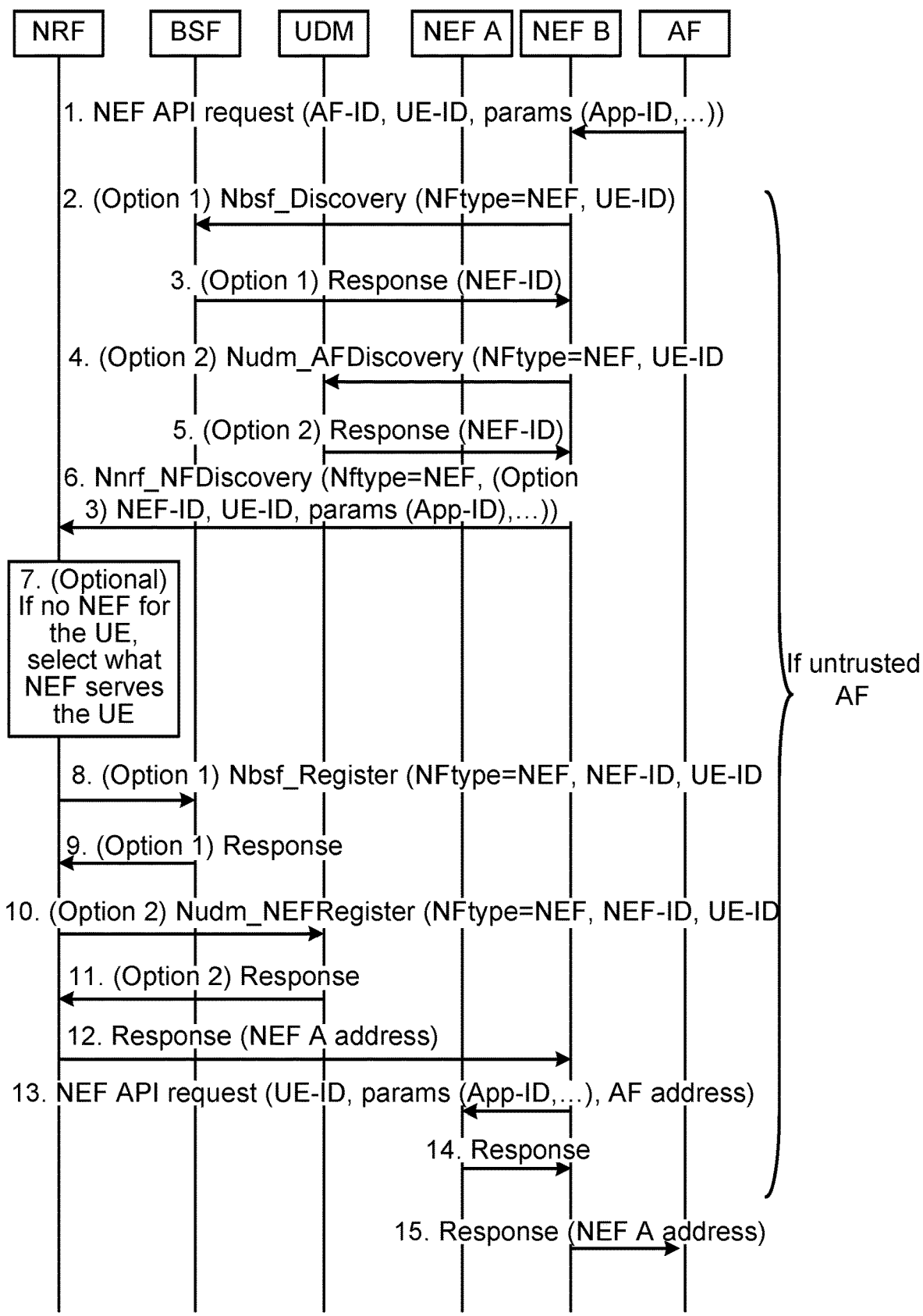

One particular embodiment for when the mapping between UE and NEF instance is stored either in the NRF, the BSF or the UDM based on at least some of the above disclosed embodiments will now be disclosed in detail with reference to the signaling diagram of FIG. 6. This particular embodiment only applies when the AF is in untrusted mode.

According to this embodiment, Option 1 corresponds to that the above disclosed 5GC network function entity 300a, 300b, 300c is a BSF 300b, Option 2, corresponds to that the 5GC network function entity 300a, 300b, 300c is a UDM entity 300c, and Option 3 corresponds to that the 5GC network function entity 300a, 300b, 300c is an NRF 300a.
1. The AF invokes an API in the default or front-end NEF (e.g. Application QoS, etc.), specifying the AF-ID, the UE-ID, and (optionally) other parameters (e.g. App-ID, . . . ).
2. (Option 1) If the BSF is the entity storing the mapping between UE and NEF instance, the default NEF tries to discover the NEF serving the UE by invoking the Nbsf_Discovery service in the BSF, specifying that NFtype=NEF, and the UE-ID, and (optionally) other parameters (e.g. App-ID, . . . ).
3. (Option 1) The BSF responds with the NEF-ID, or an error indication in case there is no NEF instance stored for the specified UE-ID.
4. (Option 2) If the UDM is the entity storing the mapping between UE and NEF instance, the default NEF tries to discover the NEF serving the UE by invoking the Nudm_AFDiscovery service in UDM, specifying that NFtype=NEF, and the UE-ID, and (optionally) other parameters (e.g. App-ID, . . . ).
5. (Option 2) The UDM responds with the NEF-ID, or an error indication in case there is no NEF instance stored for the specified UE-ID.
6. The default NEF invokes the Nnrf_NFDiscovery service in the NRF, specifying that NFtype=NEF, the UE-ID, and (optionally) other parameters (e.g. App-ID, . . . ). (Option 1, Option 2) The default NEF specifies the NEF-ID in case the mapping between UE and NEF instance is stored in the BSF or the UDM. (Option 3) If the mapping between UE and NEF instance is stored in the NRF the field for the NEF-ID is either empty or not present.
7. (Optional) If there is no NEF assigned to the UE-ID, the NRF decides which NEF instance is to be assigned to the UE based on the parameters received in the discovery request in action 6.
8. (Option 1) If the NRF assigns a NEF to the UE in action 7 and the mapping between UE and NEF instance is stored in the BSF, the NRF registers the mapping between UE and NEF instance in the BSF by invoking the Nbsf_Register service, specifying that NFtype=NEF, the NEF-ID, and the UE-ID, and (optionally) other parameters (e.g. App-ID, . . . ).
9. (Option 1) The BSF acknowledges the registration.
10. (Option 2) If the NRF assigns a NEF to the UE in action 7 and the mapping between UE and NEF instance is stored in the UDM, the NRF registers the mapping between UE and NEF instance in the UDM by invoking the Nudm_NEFRegister service specifying that NFtype=NEF, the NEF-ID, and the UE-ID, and (optionally) other parameters (e.g. App-ID, . . . ).
11. (Option 2) The UDM acknowledges the registration. (Option 3) If the mapping between UE and NEF instance is stored in the NRF, the NRF stores internally the UE-ID in the NF Profile of the assigned NEF instance, and (optionally) other parameters (e.g. App-ID, . . . ).
12. The NRF responds to the default NEF with the address of the NEF serving the UE.
13. The default NEF invokes the same API as in action 1 in the NEF serving the UE, specifying the UE-ID, the AF Address so that the NEF serving the UE is enabled to communicate with this AF, and (optionally) other parameters (e.g. App-ID, . . . ).
14. The NEF serving the UE responds to the default NEF.
15. The default NEF responds to the AF, specifying the address of the NEF serving the UE. For any subsequent request (on a per UE basis) to the NEF, the AF sends the subsequent request using the address of the NEF serving the UE.

Figure 7:
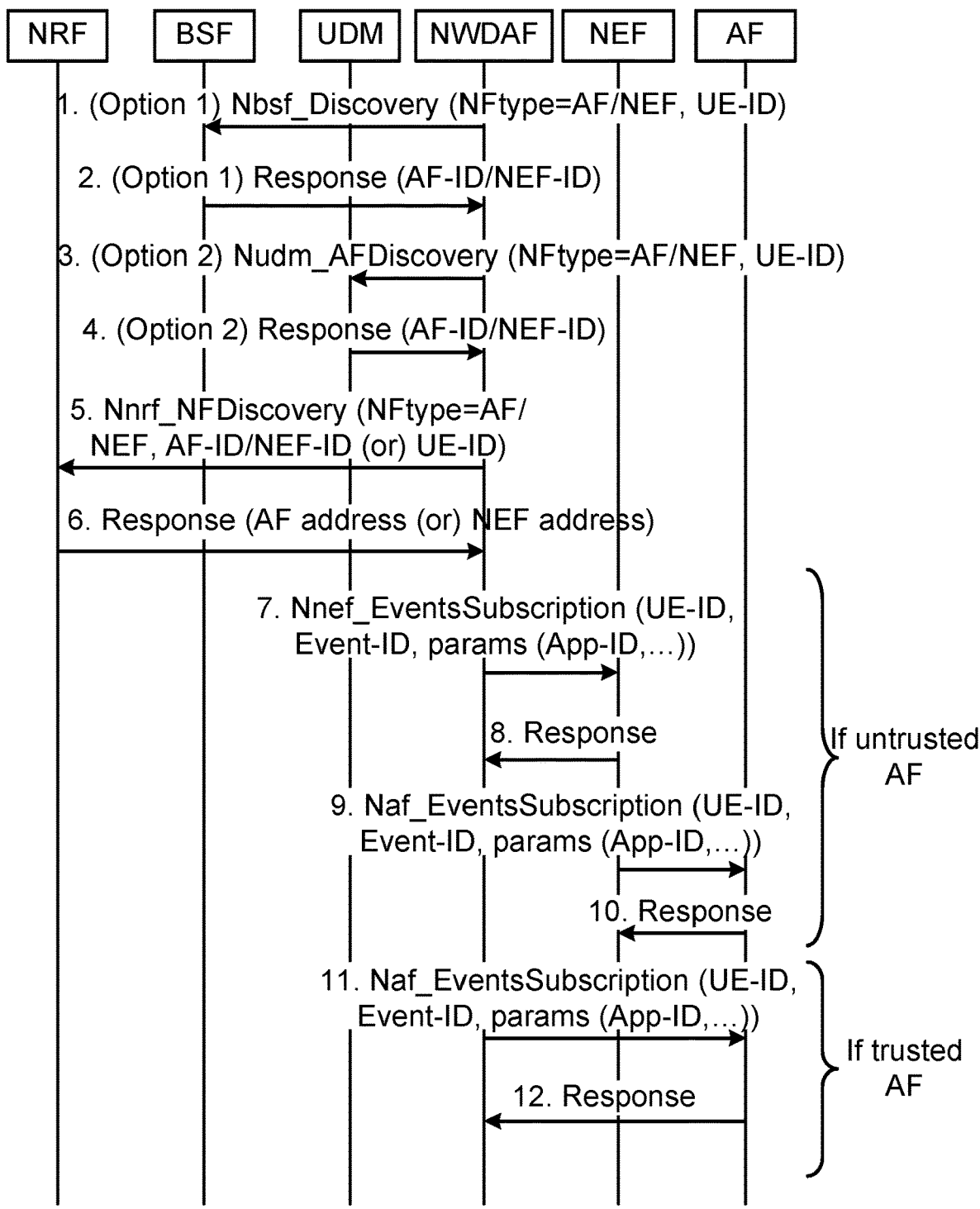

One particular embodiment for when the NWDAF entity discovers, for data collection, the NEF or AF serving the UE based on at least some of the above disclosed embodiments will now be disclosed in detail with reference to the signaling diagram of FIG. 7.

According to this embodiment, Option 1 corresponds to that the above disclosed 5GC network function entity 300a, 300b, 300c is a BSF 300b, Option 2, corresponds to that the 5GC network function entity 300a, 300b, 300c is a UDM entity 300c, and Option 3 corresponds to that the 5GC network function entity 300a, 300b, 300c is an NRF 300a.

1. (Option 1) If the BSF is the entity storing the mapping between UE and NEF or AF, the NWDAF tries to discover the NEF or AF serving the UE by invoking the Nbsf_Discovery service in the BSF, specifying that NFtype=NEF or AF, and the UE-ID, and (optionally) other parameters (e.g. App-ID, . . . ).
2. (Option 1) The BSF responds with the AF-ID or NEF-ID, or an error indication in case there is no NEF or AF instance stored for the UE-ID.
3. (Option 2) If the UDM is the entity storing the mapping between UE and NEF or AF, the NWDAF tries to discover the NEF or AF serving the UE by invoking the Nudm_AFDiscovery service in the UDM, specifying that NFtype=NEF or AF, and the UE-ID, and (optionally) other parameters (e.g. App-ID, . . . ).
4. (Option 2) The UDM responds with the AF-ID or NEF-ID, or an error indication in case there is no NEF or AF instance stored for the UE-ID.
5. The NWDAF invokes the Nnrf_NFDiscovery service in the NRF, specifying that NFtype=NEF or AF, and (optionally) other parameters (e.g. App-ID, . . . ). (Option 1, Option 2) The NWDAF specifies the AF-ID or NEF-ID in case the mapping between UE and NEF or AF is stored in the BSF or the UDM. (Option 3) If the mapping between UE and NEF or AF is stored in the NRF the field for the AF-ID or NEF-ID is either empty or not present. (Option 3) The NWDAF specifies the UE-ID in case the mapping between UE and NEF or AF is stored in the NRF.
6. The NRF responds with the AF address or NEF address. In this respect, if the NWDAF wants to discover an untrusted AF, the NRF checks that the AF profile includes the indication trust=UNTRUSTED, and instead of responding with the AF address responds with the address of the NEF instance that handles the AF.

If the AF is in untrusted mode, actions 7 to 10 are performed.
7. The NWDAF invokes the Nnef_EventsSubscription service in NEF, specifying the UE-ID, and the Event-ID of the metrics to collect, and (optionally), other parameters or filters for the data collection (e.g. App-ID, . . . ).
8. The NEF acknowledges the subscription request.
9. The NEF invokes the Naf_EventsSubscription service in the AF, specifying the UE-ID, and the Event-ID of the metrics to collect, and (optionally), other parameters or filters for the data collection (e.g. App-ID, . . . ). It is here assumed that the NEF knows the AF address in case it is untrusted.
10. The AF acknowledges the subscription request.

If the AF is in trusted mode, actions 11 and 12 are performed.
11. The NWDAF invokes directly the Naf_EventsSubscription service in the AF, specifying the UE-ID, and the Event-ID of the metrics to collect, and (optionally), other parameters or filters for the data collection (e.g. App-ID, . . . ).
12. The AF acknowledges the subscription request.

In summary according to at least some of the herein disclosed embodiments, there has been presented mechanisms allowing the NWDAF to determine which NEF and AF instances are serving a specific UE for data collection purposes. The following alternatives have been disclosed: the UE-ID is registered in the NF profile of the NEF and AF in the NRF (i.e., the above disclosed 5GC network function entity 300a, 300b, 300c is an NRF 300a), or the mapping between UE and NEF or AF instance is registered in the BSF (i.e., the above disclosed 5GC network function entity 300a, 300b, 300c is a BSF 300b), or the mapping between UE and NEF or AF instance is registered in the UDM (i.e., the above disclosed 5GC network function entity 300a, 300b, 300c is a BSF 300c).

According to at least some of the herein disclosed embodiments, there has also been presented mechanisms for assigning a NEF instance to a UE. According to a first alternative, the NEF registers in NRF the UE-ID range that it handles. Then the NEF assigned to a certain UE-ID is selected based on this range by the NRF. According to a second alternative, the mapping between UE and NEF is stored in the network function entity 300a, 300b, 300b, such as either the NRF, the BSF, or the UDM. The NEF receives the first request related to a UE-ID from the AF and tries to retrieve from NRF, BSF or UDM the NEF instance that serves the UE. If there is no NEF assigned to the UE, the NRF might decides which NEF to assign the UE based on, for example, the NEF UE-ID range, App-IDs, NEF APIs the AF is interested to, and metrics that the AF indicates that it can provide for NWDAF data collection or NEF parameter provisioning procedures.

According to at least some of the herein disclosed embodiments, there has also been presented mechanisms for AF and NEF profile registration in the NRF. The NEF might register the UE-ID range that it will serve. If the AF is trusted the AF might registers its AF profile directly in the NRF. If the AF is untrusted the AF on-boards to the NEF and the NEF registers the AF profile in the NRF.

According to at least some of the herein disclosed embodiments, there has also been presented mechanisms for determining whether the AF is trusted (whereby NFs can communicate directly with the AF) or untrusted (whereby NFs communicate with the AF via the NEF). The NEF might determine whether the AF is trusted or untrusted. Information of whether the AF is trusted or untrusted is included in the AF profile in the NRF. If the AF is untrusted, the NRF responds with the corresponding NEF instance address in the AF discovery request.

Figure 8:
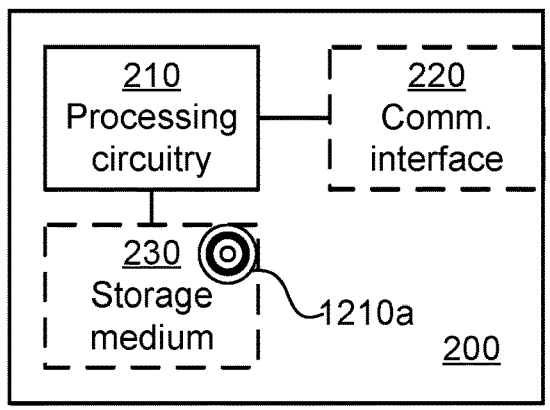
FIG. 8 is a schematic diagram showing functional units of an NWDAF entity according to an embodiment.

FIG. 8 schematically illustrates, in terms of a number of functional units, the components of an NWDAF entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210a (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the NWDAF entity 200 to perform a set of operations, or actions, as disclosed above. For example, the storage medium 230 may store the set of operations, and the processing circuitry 210 may be configured to retrieve the set of operations from the storage medium 230 to cause the NWDAF entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The NWDAF entity 200 may further comprise a communications interface 220 for communications with other entities, functions, nodes and devices of the communication network 100. As such the communications interface 220 may comprise one or more transmitters and receivers, comprising analogue and digital components.

The processing circuitry 210 controls the general operation of the NWDAF entity 200 e.g. by sending data and control signals to the communications interface 220 and the storage medium 230, by receiving data and reports from the communications interface 220, and by retrieving data and instructions from the storage medium 230. Other components, as well as the related functionality, of the NWDAF entity 200 are omitted in order not to obscure the concepts presented herein.

Figure 9:
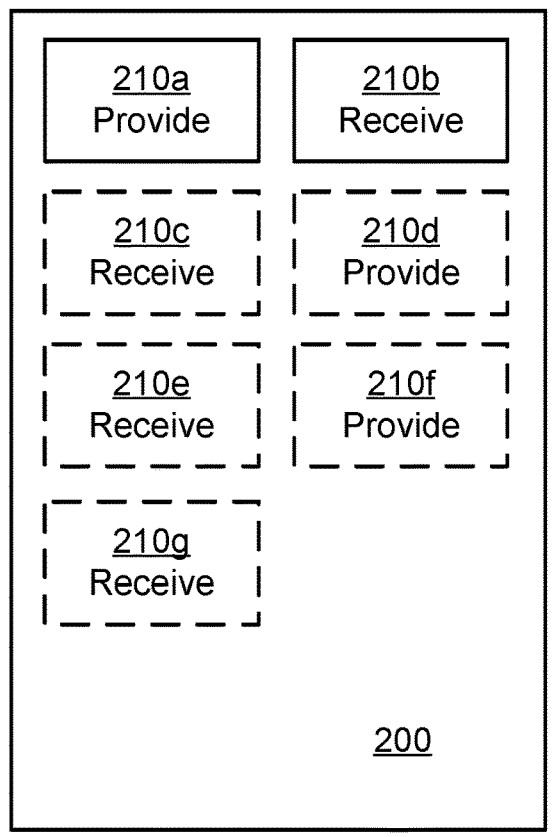
FIG. 9 is a schematic diagram showing functional modules of an NWDAF entity according to an embodiment.

FIG. 9 schematically illustrates, in terms of a number of functional modules, the components of an NWDAF entity 200 according to an embodiment. The NWDAF entity 200 of FIG. 9 comprises a number of functional modules; a provide module 210a configured to perform action S102, and a receive module 210b configured to perform action S104. The NWDAF entity 200 of FIG. 9 may further comprise a number of optional functional modules, such as any of a receive module 210c configured to perform action S106, a provide module 210d configured to perform action S108, a receive module 210e configured to perform action S110, a provide module 210f configured to perform action S112, and a receive module 210fg configured to perform action S114.

In general terms, each functional module 210a-210g may be implemented in hardware or in software. Preferably, one or more or all functional modules 210a-210g may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210g and to execute these instructions, thereby performing any actions of the NWDAF entity 200 as disclosed herein.

Figure 10:
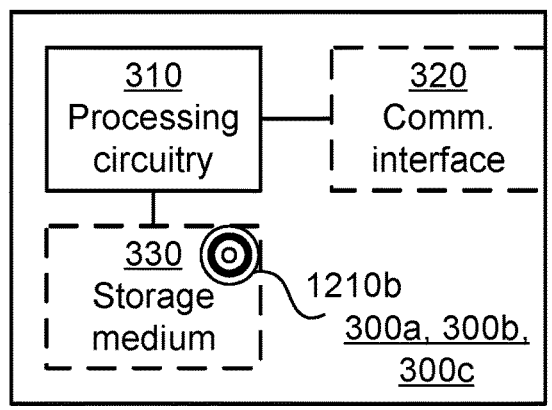
FIG. 10 is a schematic diagram showing functional units of a 5GC network function entity according to an embodiment.

FIG. 10 schematically illustrates, in terms of a number of functional units, the components of a 5GC network function entity 300a, 300b, 300c according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the 5GC network function entity 300a, 300b, 300c to perform a set of operations, or actions, as disclosed above. For example, the storage medium 330 may store the set of operations, and the processing circuitry 310 may be configured to retrieve the set of operations from the storage medium 330 to cause the 5GC network function entity 300a, 300b, 300c to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The 5GC network function entity 300a, 300b, 300c may further comprise a communications interface 320 for communications with other entities, functions, nodes and devices of the communication network 100. As such the communications interface 320 may comprise one or more transmitters and receivers, comprising analogue and digital components.

The processing circuitry 310 controls the general operation of the 5GC network function entity 300a, 300b, 300c e.g. by sending data and control signals to the communications interface 320 and the storage medium 330, by receiving data and reports from the communications interface 320, and by retrieving data and instructions from the storage medium 330. Other components, as well as the related functionality, of the 5GC network function entity 300a, 300b, 300c are omitted in order not to obscure the concepts presented herein.

Figure 11:
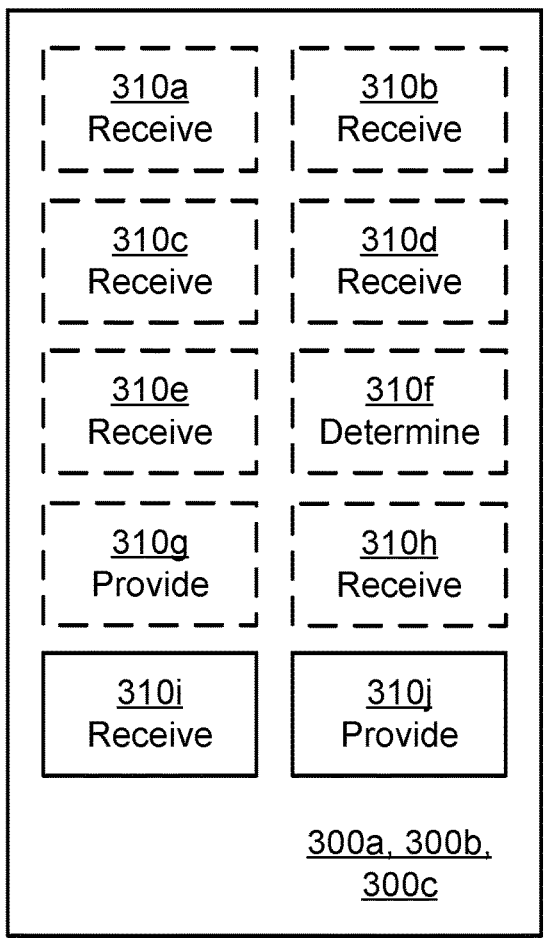
FIG. 11 is a schematic diagram showing functional modules of a 5GC network function entity according to an embodiment.

FIG. 11 schematically illustrates, in terms of a number of functional modules, the components of a 5GC network function entity 300a, 300b, 300c according to an embodiment. The 5GC network function entity 300a, 300b, 300c of FIG. 11 comprises a number of functional modules; a receive module 310i configured to perform action S218, and a provide module 310j configured to perform action S220. The 5GC network function entity 300a, 300b, 300c of FIG. 11 may further comprise a number of optional functional modules, such as any of a receive module 310a configured to perform action S202, a receive module 310b configured to perform action S204, a receive module 310c configured to perform action S206, a receive module 310d configured to perform action S208, a receive module 310e configured to perform action S210, a determine module 310f configured to perform action S212, a provide module 310g configured to perform action S214, and a receive module 310h configured to perform action S216.

In general terms, each functional module 310a-310j may be implemented in hardware or in software. Preferably, one or more or all functional modules 310a-310j may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310j and to execute these instructions, thereby performing any actions of the 5GC network function entity 300a, 300b, 300c as disclosed herein.

The NWDAF entity 200 and/or the 5GC network function entity 300a, 300b, 300c may be provided as a standalone device or as a part of at least one further device. Alternatively, functionality of the NWDAF entity 200 and/or the 5GC network function entity 300a, 300b, 300c may be distributed between at least two devices, or nodes. In general terms, instructions that are required to be performed in real time may be performed in a device, or node, operatively closer to the cell than instructions that are not required to be performed in real time. Thus, a first portion of the instructions performed by the NWDAF entity 200 and/or the 5GC network function entity 300a, 300b, 300c may be executed in a first device, and a second portion of the instructions performed by the NWDAF entity 200 and/or the 5GC network function entity 300a, 300b, 300c may be executed in a second device; the herein disclosed embodiments are not limited to any particular number of devices on which the instructions performed by the NWDAF entity 200 and/or the 5GC network function entity 300a, 300b, 300c may be executed. Hence, the methods according to the herein disclosed embodiments are suitable to be performed by an NWDAF entity 200 and/or the 5GC network function entity 300a, 300b, 300c residing in a cloud computational environment. Therefore, although a single processing circuitry 210, 310 is illustrated in FIGS. 8 and 10 the processing circuitry 210, 310 may be distributed among a plurality of devices, or nodes. The same applies to the functional modules 210a-210g, 310a-310j of FIGS. 9 and 11 and the computer programs 1220a, 1220b of FIG. 12.

Figure 12:
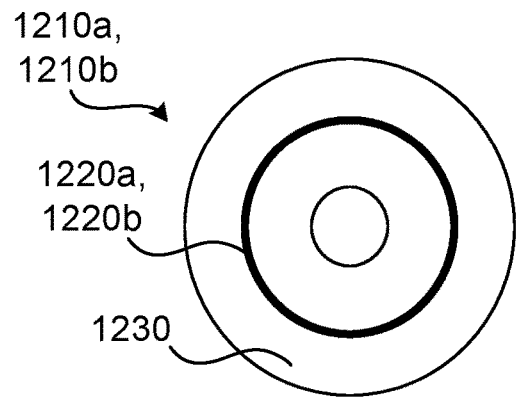
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any actions of the NWDAF entity 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any actions of the 5GC network function entity 300a, 300b, 300c as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended list of claims.

The invention claimed is:

1. A method for discovering, for data collection, which network exposure function (NEF) or application function (AF) is serving a user equipment (UE) the method being performed by processing circuitry of a network data analytics function (NWDAF) entity, the method comprising:
providing, to a 5GC network function entity, a query of which NEF or AF is serving the UE, the query comprising an ID of the UE;
receiving, from the 5GC network function entity, a response comprising an ID of the NEF or the AF when there is a NEF or AF instance stored in the 5GC network function entity for the UE; and
receiving, from a network repository function (NRF) an address to the NEF or the AF.

2. The method according to claim 1, wherein the 5GC network function entity is one of: a network repository function, NRF; a binding support function, BSF; or a unified data management, UDM, entity.

3. The method according to claim 1, wherein the query invokes a discovery service in the 5GC network function entity.

4. The method according to claim 1, wherein, when the 5GC network function entity is the NRF, the address to the NEF or the AF is received in the response from the 5GC network function entity.

5. The method according to claim 1, wherein, when the 5GC network function entity is not the NRF, the address to the NEF or the AF is received in response to the NWDAF entity having provided a query to the NRF for a discovery service.

6. The method according to claim 1, wherein the address to the AF is received when the AF is in trusted mode, and wherein the address to the NEF is received when the AF is in untrusted mode.

7. The method according to claim 1, wherein an explicit indication of whether the AF is in trusted mode or in untrusted mode is received from the NRF.

8. The method according to claim 7, wherein, when the AF is in untrusted mode, the method further comprises:
providing, to the NEF, a request for event subscription for the UE, the request comprising an ID of the UE and at least one identifier of metrics to be collect by the NWDAF for the UE; and
receiving, from the NEF, an acknowledgement of the event subscription.

9. The method according to claim 7, wherein, when the AF is in trusted mode, the method further comprises:
providing, to the AF, a request for event subscription for the UE, the request comprising an ID of the UE and at least one identifier of metrics to be collect by the NWDAF for the UE; and
receiving, from the AF, an acknowledgement of the event subscription.

10. The method according to claim 1, wherein the response comprises an error indication in case there is no NEF or AF instance stored in the 5GC network function entity for the UE.

11. A method for enabling discovery, for data collection, which network exposure function (NEF) or application function (AF) is serving a user equipment (UE) the method being performed by processing circuitry of a 5GC network function entity, the method comprising:

receiving, from a network data analytics function (NWDAF) entity, a query of which NEF or AF is serving the UE, the query comprising an ID of the UE; and providing, to the NWDAF entity, a response comprising an ID of the NEF or the AF when there is a NEF or AF instance stored in the 5GC network function entity for the UE, when the 5GC network function entity is a network repository function (NRF) an address to the NEF or the AF being provided in the response.

12. The method according to claim 11, wherein the 5GC network function entity is one of: a network repository function, NRF; a binding support function, BSF; or a unified data management, UDM, entity.

13. The method according to claim 11, wherein the query invokes a discovery service in the 5GC network function entity.

14. The method according to claim 11, wherein the address to the AF is provided when the AF is in trusted mode, and wherein the address to the NEF is provided when the AF is in untrusted mode.

15. The method according to claim 11, wherein an explicit indication of whether the AF is in trusted mode or in untrusted mode is provided to the NWDAF entity.

16. The method according to claim 11, further comprising:

receiving, from the NEF when the AF is in untrusted mode, an AF profile for registration of the AF in the network function, the AF profile comprising an indication that the AF is in untrusted mode.

17. A network data analytics function (NWDAF) entity for discovering, for data collection, which network exposure function (NEF) or application function (AF) is serving a user equipment (UE) the NWDAF entity comprising processing circuitry, the processing circuitry being configured to cause the NWDAF entity to:

provide, to a 5GC network function entity, via processing circuitry thereof, a query of which NEF or AF is serving the UE, the query comprising an ID of the UE;

receive, from the 5GC network function entity, via processing circuitry thereof, a response comprising an ID of the NEF or the AF when there is a NEF or AF instance stored in the 5GC network function entity for the UE; and receive, from a network repository function (NRF) an address to the NEF or the AF.

* * * * *